United States Patent
Bednar et al.

(10) Patent No.: US 10,406,976 B2
(45) Date of Patent: Sep. 10, 2019

(54) MULTI-PURPOSE AUTOMOTIVE SOUND DEVICE

(71) Applicant: Ford Global Technologies, LLC, Dearborn, MI (US)

(72) Inventors: Chad Bednar, Royal Oak, MI (US); Erik J. Christen, Royal Oak, MI (US); Mahmoud Abdelhamid, Canton, MI (US); Kevin James Rhodes, Dearborn, MI (US); Yang Yang, Belleville, MI (US); Prasad Venkiteswaran, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/884,716

(22) Filed: Jan. 31, 2018

(65) Prior Publication Data

US 2019/0232867 A1 Aug. 1, 2019

(51) Int. Cl.
*B60Q 5/00* (2006.01)
*H04R 1/02* (2006.01)

(52) U.S. Cl.
CPC ............. *B60Q 5/008* (2013.01); *H04R 1/025* (2013.01); *H04R 2499/13* (2013.01)

(58) Field of Classification Search
CPC .......... B60Q 5/006; B60Q 5/008; B60Q 7/02; B60Q 5/005; B60Q 5/00; H04R 1/025; H04R 2499/13
See application file for complete search history.

(56) References Cited

U.S. PATENT DOCUMENTS

| | | | | |
|---|---|---|---|---|
| 3,943,507 A | * | 3/1976 | Neal | B60Q 1/22 340/384.7 |
| 4,785,280 A | * | 11/1988 | Fubini | B60C 23/0401 340/328 |
| 5,418,518 A | * | 5/1995 | Schenken | A01M 29/18 116/22 A |
| 5,515,026 A | * | 5/1996 | Ewert | B60Q 1/525 116/22 A |
| 5,635,903 A | * | 6/1997 | Koike | A63H 17/34 340/384.1 |
| 7,042,340 B2 | * | 5/2006 | Ewert | A01M 29/16 116/22 A |
| 7,876,910 B2 | * | 1/2011 | Sakamoto | G10K 11/178 381/71.4 |

(Continued)

FOREIGN PATENT DOCUMENTS

CN 107199946 A 9/2017
KR 20120030900 A 3/2012

(Continued)

*Primary Examiner* — Hai Phan
*Assistant Examiner* — Son M Tang
(74) *Attorney, Agent, or Firm* — Frank Lollo; Neal, Gerber & Eisenberg LLP; James P. Muraff (57) ABSTRACT

A vehicle includes a multi-purpose automotive sound device for alerting pedestrians. The vehicle includes front and rear wheels, side mirrors, a sound device, and a controller. The sound device operates in a first mode and a second mode to generate an audio signal. The sound device is disposed adjacent to the front wheel and one of the side mirrors. The controller activates the sound device in the first mode or the second mode based on a state of the vehicle.

14 Claims, 5 Drawing Sheets

(56) References Cited

U.S. PATENT DOCUMENTS

| | | | | |
|---|---|---|---|---|
| 7,961,894 B2* | 6/2011 | Honji | ................... | G10K 15/02 340/384.3 |
| 8,018,328 B2* | 9/2011 | Goldstein | ................ | B60Q 5/00 340/384.1 |
| 8,093,994 B2* | 1/2012 | McGaughy | ............. | B60Q 5/00 116/22 A |
| 8,217,767 B2 | 7/2012 | Nakayama | | |
| 8,378,804 B2* | 2/2013 | Inoue | ................... | B60Q 5/008 340/425.5 |
| 8,537,030 B2* | 9/2013 | Perkins | ................. | B60Q 1/506 340/425.5 |
| 8,710,974 B2* | 4/2014 | Iwamoto | ............... | B60Q 5/008 340/384.1 |
| 9,580,010 B2* | 2/2017 | Sakakibara | ........... | B60Q 5/008 |
| 9,981,617 B1* | 5/2018 | MacDonald | ......... | F02D 41/107 |
| 10,000,152 B1* | 6/2018 | Scalea | ................... | G08G 1/162 |
| 10,065,561 B1* | 9/2018 | Bastyr | ................... | B60Q 5/008 |
| 10,163,434 B1* | 12/2018 | Valeri | ................... | G10K 15/02 |
| 2003/0006897 A1* | 1/2003 | Chapin | ................... | B60Q 1/54 340/466 |
| 2008/0114904 A1* | 5/2008 | Kosco | ..................... | B60Q 5/00 710/13 |
| 2009/0066499 A1 | 3/2009 | Bai et al. | | |
| 2009/0085770 A1* | 4/2009 | Mergen | ................. | B60Q 5/008 340/904 |
| 2010/0266135 A1* | 10/2010 | Theobald | ............ | G10K 11/178 381/71.4 |
| 2011/0010269 A1* | 1/2011 | Ballard | ................. | B60Q 5/008 705/26.41 |
| 2011/0175718 A1* | 7/2011 | Inoue | ................... | B60Q 5/008 340/463 |
| 2011/0279261 A1* | 11/2011 | Gauger | ................... | F16P 3/14 340/539.1 |
| 2012/0068836 A1* | 3/2012 | Konet | ................... | B60Q 5/008 340/425.5 |
| 2012/0166042 A1* | 6/2012 | Kokido | ................. | B60Q 5/008 701/36 |
| 2012/0286970 A1* | 11/2012 | Castillo | .................... | B60Q 5/00 340/903 |
| 2013/0106599 A1* | 5/2013 | Nakayama | ............ | G10K 11/26 340/466 |
| 2014/0240118 A1* | 8/2014 | Lee | ........................ | B60Q 5/008 340/463 |
| 2015/0035660 A1* | 2/2015 | Sakakibara | ........... | B60Q 5/008 340/425.5 |
| 2015/0336507 A1* | 11/2015 | Collins | .................. | B60Q 5/005 340/464 |
| 2016/0068102 A1* | 3/2016 | Tsuzuki | .................. | B60C 5/008 340/939 |
| 2016/0075278 A1* | 3/2016 | Tsuzuki | ................... | H03G 3/20 340/463 |
| 2016/0082882 A1* | 3/2016 | Tsuzuki | ................. | B60Q 5/008 340/425.5 |
| 2016/0090038 A1* | 3/2016 | Briggs | .................. | B60Q 1/305 340/435 |
| 2016/0133135 A1* | 5/2016 | Iliev | ...................... | G08G 1/162 340/903 |
| 2016/0152183 A1* | 6/2016 | Kim | ....................... | B60Q 11/00 381/58 |
| 2016/0304027 A1* | 10/2016 | Di Censo | ................. | B60Q 5/00 |
| 2017/0001559 A1* | 1/2017 | Kwon | .................... | G10K 15/02 |
| 2017/0101058 A1* | 4/2017 | Park | ...................... | B60R 1/081 |
| 2017/0134858 A1* | 5/2017 | Kanemori | ............... | H04R 3/12 |
| 2018/0170229 A1* | 6/2018 | Hashimoto | .............. | B60N 2/90 |
| 2018/0208112 A1* | 7/2018 | Tayama | ................... | B60Q 5/00 |

FOREIGN PATENT DOCUMENTS

| | | |
|---|---|---|
| KR | 20170002973 A | 1/2017 |
| KR | 20170049310 A | 5/2017 |

* cited by examiner

MULTI-PURPOSE AUTOMOTIVE SOUND DEVICE

TECHNICAL FIELD

The present disclosure generally relates to external sound generating devices for a vehicle and, more specifically, multi-purpose automotive sound device for alerting pedestrians.

BACKGROUND

Hybrid/electric light-duty vehicles generally produce little to no external sound during the course of their travel. As such, visually impaired pedestrians have difficult time identifying the proximity of the hybrid/electric light-duty vehicles. Recently, hybrid/electric light-duty vehicles have been manufactured to include horns or speakers to generate artificial noise and alert nearby pedestrians.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for multi-purpose automotive sound device for alerting pedestrians. An example vehicle includes front and rear wheels, side mirrors, a sound device, and a controller. The sound device operates in a first mode and a second mode to generate an audio signal. The sound device is disposed adjacent to the front wheel and one of the side mirrors. The controller activates the sound device in the first mode or the second mode based on a state of the vehicle.

A method of operating an example vehicle includes detecting, by a controller, a state of the vehicle, determining, by the controller, whether an input corresponds to a first mode or a second mode based on the state of the vehicle, and generating, by the sound device, an audio signal corresponding to the input. The audio signal is outputted from a location adjacent to a front wheel and one of side mirrors of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Hybrid/electric light-duty vehicles, particularly, hybrid/electric vehicles with a gross vehicle weight of 10,000 pounds or less generally produce little to no external sound when the vehicles are traveling at low speed (e.g., under 30 km/h). For pedestrians who are distracted, blind or have low vision, it is difficult to sense and approximate the distance between themselves and the hybrid/electric light-duty vehicles. Recently, U.S. Department of Transportation's Nation Highway Traffic Safety Administration (NHTSA) proposed "Minimum Sound Requirements for Hybrid and Electric Vehicles", and United Nations proposed "Regulation No. 138-00". These regulations mandate all hybrid/electric light-duty vehicles to generate an audible noise when traveling at low speeds such that pedestrians may readily detect the presence, direction, and location of these vehicles. For example, conventional hybrid/electric light-duty vehicles are manufactured with multiple horns in various locations to meet these regulations; however, these horns generate sound from limited frequency bands and are generally expensive and bulky. Further, extensive hardware components are required to be installed to accommodate each of the horns in the vehicle. For example, depending on the location of a power source and/or other components that require connection to a horn, additional wire must be provided to accommodate each of the horns in the vehicle. Installing additional horns and hardware components increases complexity, power consumption, cost, and occupies additional space.

As disclosed below, a vehicle includes a multi-purpose sound device that operates in a first mode and a second mode to generate a range of external sound. The multi-purpose sound device is located within the vehicle. In some examples, the multi-purpose sound device is positioned in the front half of the vehicle. In some such examples, the multi-purpose sound device is located in close proximity to a power source (e.g., a low voltage battery, etc.) and an electronic control unit (ECU) that controls the multi-purpose sound device. In some examples, the multi-purpose sound device is installed on a frame or a body of the vehicle. In some examples, the multi-purpose sound device is positioned in the vehicle at a location that is between and/or adjacent to a side mirror and a wheel well. In this location, the multi-purpose sound device is in close proximity with and is easily affixed/attached to a body/frame of the vehicle. As a result, in this location, wiring(s) and other hardware components used to connect the multiple-purpose sound device to the power source and the controller are reduced. Additionally, in this location, a sound generated by the multi-purpose sound device is output in a wide range and reach multiple pedestrians in different positions with respect to the vehicle. In some examples, the multi-purpose sound device is the only device that generates external sound. Alternatively, in some examples, one or more external sound generating devices may be installed in the vehicle in addition to the multi-purpose sound device to supplement the noise generated by the multi-purpose sound device. For example, a speaker may be installed on the rear position of the vehicle. The multi-purpose sound device generates an audio signal defined by in sound pressure levels (SPL) and frequencies. Here, SPL is a logarithmic measure of the effective pressure of a sound relative to a reference value (e.g., the threshold of hearing) and is measured in decibels (dB). The SPL affects how a person perceives the sound generated by the multi-purpose sound device at the selected frequency. In the first mode, the multi-purpose sound device generates a first audio signal, and in the second mode, the multi-purpose sound device generates a second audio signal.

The multi-purpose sound device includes a first sounder, a second sounder, and a switch controllable by a powertrain control unit. The first sounder generates the first audio signal when the multi-purpose sound device is in the first mode, and the second sounder generates the second audio signal when the multi-purpose sound device is in the second mode. In such examples, the first sounder and the second sounder are physical devices. For example, the first sounder may be a horn, and the second sounder may be a speaker or other sound generating device. In alternative examples, one or more of the first sounder and second sounder are virtually implemented in the multi-purpose sound device. In such examples, the multi-purpose sound device is a single sound generator capable of producing both the first audio signal and the second audio signal. The first sounder and the second sounder respectively generate the first audio signal and the second audio signal at various sound pressure levels and frequencies as described below.

The vehicle further includes a powertrain control unit (PTCU). The PTCU includes hardware and firmware to control various powertrain features of vehicles, such as full hybrid electric vehicles (FHEVs), plug-in hybrid electric vehicles (PHEVs), and battery electric vehicles (BEVs). In some examples, the PTCU monitors sensors and uses control algorithms to control, for example, AC/DC charging system, brake and acceleration system, and power management, among other features of the HEV or BEV. In some examples, the PTCU includes an Audible Vehicle Alert System (AVAS) controller communicatively coupled to the multi-purpose sound device. In alternative examples, the AVAS controller is included in the multi-purpose sound device and is communicatively coupled to the PTCU. The AVAS controller determines whether the multi-purpose sound device operates in the first mode or the second mode based on a state of the vehicle.

In the first mode, the AVAS controller controls the first sounder to generate the first audio signal. In some examples, AVAS controller activates the first mode in response to receiving an input from a driver (such as an input from a horn activation button on the steering wheel). In some examples, the first audio signal is a fixed audio signal. For example, the first sounder may generate the first audio signal with a frequency value and an SPL value having predefined values (e.g., defined at manufacture of the multi-purpose sound device, etc.). For example, the AVAS controller may control the first sounder to generate the first audio signal that is the same every time the horn activation button is pressed.

In the second mode, the AVAS controller controls the second sounder to generate the second audio signal. In some examples, the AVAS controller activates the second mode in response detecting that the vehicle is traveling in reverse or forward at a speed lower than a threshold speed. In some examples, in response the vehicle is traveling in reverse or traveling forward at a speed lower than the threshold speed, the AVAS controller controls the second sounder to generate the second audio signal as a fixed audio signal. In such example, the second sounder generates the second audio signal at a frequency value and an SPL value each having a predefined value. Alternatively, in some examples, in response to the vehicle traveling forward at a speed lower than the threshold speed, the AVAS controller controls the second sounder to generate the second audio signal as a variable audio signal. For example, depending on the speed and/or direction of the vehicle, the AVAS controller may select certain frequencies and/or SPL values from predefined ranges and generate the second audio signal based on the selected frequency and SPL values.

In such manner, the multi-purpose sound device facilitates alerting pedestrians location, distance, and direction of travel of the hybrid/electric light-duty vehicles while providing various sounds and simplifying the internal hardware/software components of the vehicle.

Figure 1:
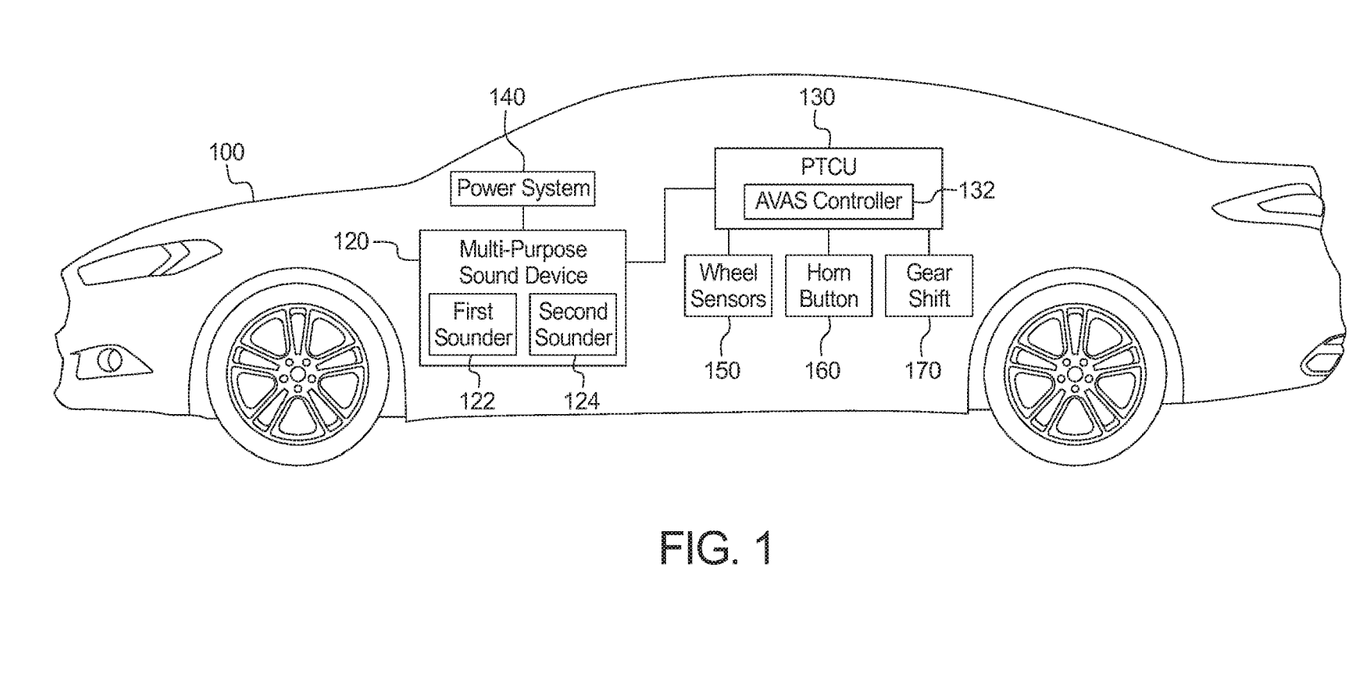
FIG. 1 illustrates a vehicle operating in accordance with this disclosure.

FIG. 1 illustrates a vehicle 100 operating in accordance with the teachings of this disclosure. The vehicle 100 may be a light duty hybrid vehicle, electric vehicle, and/or fuel cell vehicle. The vehicle 100 includes parts related to mobility, such as a powertrain with an engine and/or an electric motor, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a multi-purpose sound device 120, a PTCU 130, a power system 140, wheel speed sensors 150, a horn button 160, and a gear shift 170.

The multi-purpose sound device 120 operates in a first mode and in a second mode. In the illustrated example, the multi-purpose sound device 120 includes a first sounder 122, a second sounder 124, and a switch (not-shown). In some examples, the first sounder 122, the second sounder 124, and the switch are physical components. For example, the first sounder 122 may be a vehicle horn, the second sounder 124 may be a speaker or other sound generating device, and the switch may be a 2x1 multiplexing circuit. Alternatively, the multi-purpose sound device 120 may be a single speaker or other sound generating device that virtually implements the first sounder 122, the second sounder 124, and the switch. In such examples, the speaker or other sound generating device of the multi-purpose sound device 120 is capable of producing the frequencies at the SPL values of the first sounder 122 and the second sounder 124. The first sounder 122 and the second sounder 124 generates the first audio signal and the second audio signal, respectively. In some examples, each of the first audio signal and the second audio signal include a frequency value and an SPL value that are within a predefined range.

Figure 2:
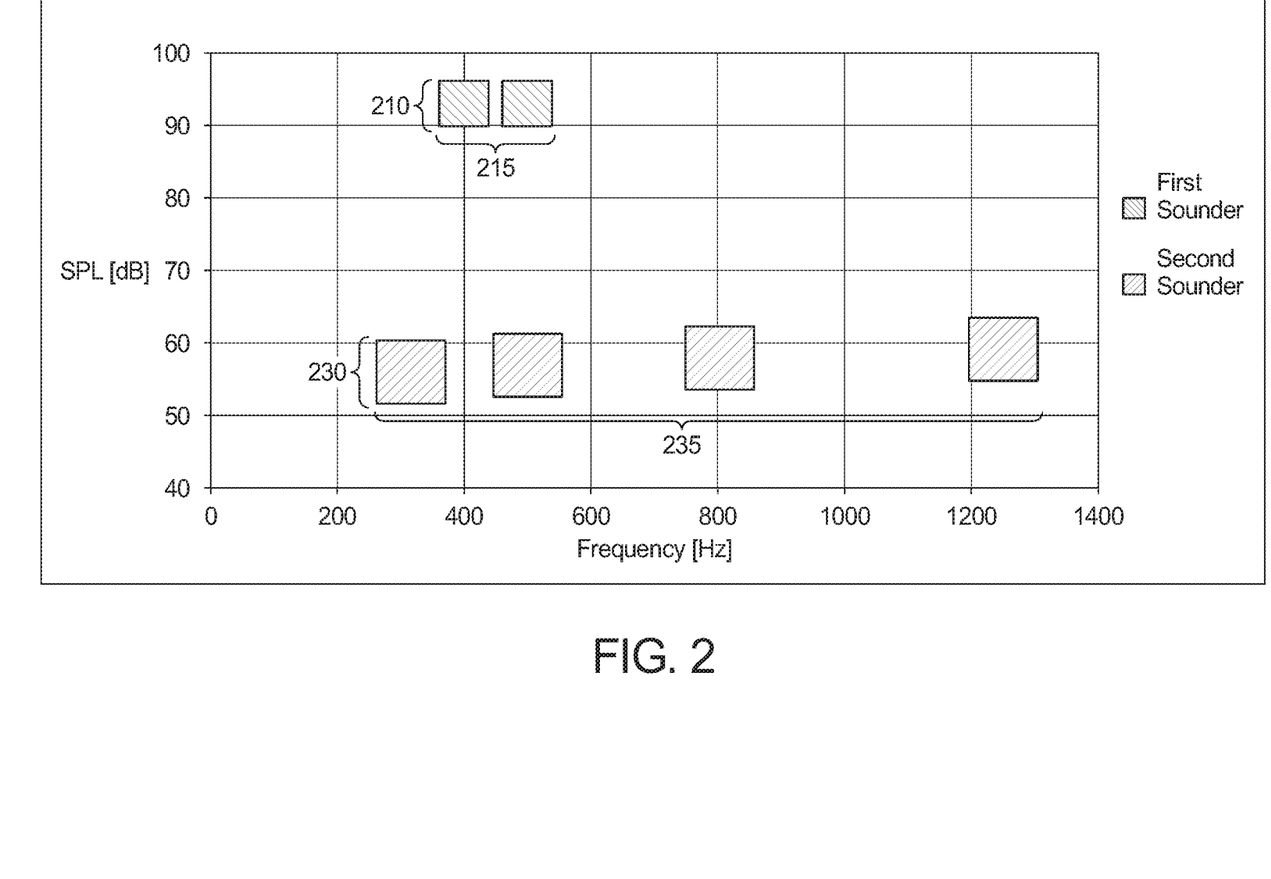
FIG. 2 illustrates an example graph of frequency range and sound pressure level ranges of sound devices in the vehicle of FIG. 1.

As shown in FIG. 2, in some examples, the first sounder 122 generates the first audio signal as a fixed audio signal. For example, the first sounder may generate the first audio signal at a frequency value falling under a first frequency range 215 and at an SPL value falling under a first SPL range 210. In some examples, the first SPL range 210 and/or the first frequency range 215 include one or more sets of ranges. For example, the first frequency range 215 may be approximately 360-430 Hz and 450-520 Hz, and the first SPL range 210 is approximately 90-96 dB.

In some examples, the second sounder 124 generates the second audio signal as a fixed audio signal. For example, the second sounder 124 may generate the second audio signal at a frequency value falling under a second frequency range 235 and at an SPL value falling under a second SPL range 230. Alternatively, in some examples, the second sounder 124 may generate the second audio signal as a variable audio signal. For example, the AVAS controller 132 may select a certain frequency value from the second frequency range 235 and a certain SPL from the second SPL range 230 and the second sounder 124 generates the second audio signal including the selected frequency value and the SPL. In some examples, the second SPL range 230 and/or the second frequency range 235 include one or more sets of ranges. For example, the second frequency range 235 is approximately 270-370 Hz, 450-550 Hz, 750-850 Hz, and 1200-1300 Hz, and the second range of SPL is approximately 52-63 dB.

The switch selects the first sounder 122 and the second sounder 124 based on the mode that the multi-purpose sound device 120 is operating in. The switch is coupled to the first sounder 122, the second sounder 124, and the power system 140. Alternatively, in some examples, the switch may receive a control input indicating the first mode or the second mode, selects the first sounder 122 or the second sounder 124 based on the control input, and connects power from the power system 140 to the selected sounder. In some examples, the switch controls the amount of power supplied to the selected sounder depending on the control input. For example, the control input may include information regarding the amount of power required for generating an audio signal at certain frequency and SPL, and the switch may increase/decrease the voltage flow from the power system 140 to the selected sounder based on the information.

Returning to FIG. 1, the PTCU 130 includes hardware and firmware to control various features of the powertrain of a hybrid electric vehicle (HEV) or a battery electric vehicle (BEV). In some examples, the PTCU monitors sensors and uses control algorithms to control, for example, AC/DC charging system, brake and acceleration system, and power management, among other features of the HEV or BEV. In this illustrated example, the PTCU 130 is coupled to the wheel speed sensor 150, the horn button 160, and the gear shift 170. Additionally, the PTCU 130 includes an AVAS controller 132. In some examples, the PTCU 130 includes an AVAS controller 132 communicatively coupled to the multi-purpose sound device 120. In alternative examples, the AVAS controller 132 is included in the multi-purpose sound device 120 and is communicatively coupled to the PTCU 130.

The AVAS controller 132 determines whether the multi-purpose sound device 120 operates in the first mode or the second mode based on a state of the vehicle 100. For example, the state of the vehicle 100 may be defined by the speed of the vehicle 100, the direction of the vehicle 100, and/or the activation of the horn button 160. In some examples, the AVAS controller 132 receives data from the wheel speed sensors 150 to record the speed of the vehicle 100 for a time period to determine the acceleration/deceleration of the vehicle 100. In some examples, The AVAS controller 132 detects the direction of the vehicle 100 in motion. For example, the AVAS controller 132 determines that the vehicle 100 is traveling in a reverse direction when the AVAS controller detects that the gear shift 170 is shifted to reverse. In alternative examples, the AVAS controller 132 may be coupled to a global positioning system (GPS) (not shown) to determine the direction of the vehicle 100 in motion. When the AVAS controller 132 detects that the horn button 160 is triggered, the AVAS controller 132 activates the first mode. When the AVAS controller 132 detects that the gear shift 170 is in reverse or the vehicle 100 is traveling forward at a speed that satisfies a threshold speed (e.g., under 30 km/h), the AVAS controller 132 activates the sound device in the second mode.

In some examples, the AVAS controller 132 defines the range of frequency and SPL at which the first audio signal and the second audio signal are generated. For example, the AVAS controller 132 may determine the minimum/maximum SPL or frequency range at which the first sounder or the second sounder is capable of generating. In such example, the AVAS controller 132 may define one or more ranges of frequency or SPL within the minimum/maximum SPL or frequency range. In some examples, the AVAS controller 132 alters the first SPL range 210 and/or the first frequency range 215 based on the second SPL range 230 and/or the second frequency range 235, vice-versa. For example, the AVAS controller 132 may detect that at least a portion of second frequency range 235 overlaps with the first frequency range 215, and omit the overlapping portion of the second frequency range 235. This way, frequency of audio signals respectively generated by the first sounder 122 and the second sounder 124 is differentiated.

In the first mode, the AVAS controller 132 activates the first sounder 122 to generate the first audio signal. During the first mode, the second sounder 124 is deactivated or in a stand-by mode (e.g., power saving mode).

In the second mode, the AVAS controller 132 activates the second sounder 124 is activated to generate the second audio signal. During the second mode, the first sounder 122 is deactivated or in a stand-by mode.

Alternatively, in some examples, when the AVAS controller 132 detects that the vehicle 100 is traveling forward at a speed under the threshold speed, the AVAS controller 132 generates the second audio signal as a variable audio signal. In some such examples, the AVAS controller 132 partitions speeds below the threshold speed into speed ranges. For example, the AVAS controller 132 may define speed ranges from 0-10 km/h, 10 km/h to 20 km/h, 20 to 30 km/h, and/or 30 km/h or greater. In such examples, the second frequency range 235 and/or SPL range 230 is partitioned into subranges, and each of the second frequency subranges and/or SPL subranges may be assigned to each of the speed ranges. In some examples, the addition of the speed ranges and the assignment of the second frequency subranges and/or SPL subranges may be predetermined by the manufacturer or configured by an operator through a user interface (not shown) within the vehicle 100. In such examples, when the vehicle 100 is traveling forward at a speed that is within one of the speed ranges, the second sounder 124 generates the second audio signal at a frequency value and/or an SPL value of the corresponding frequency and/or SPL value subranges.

Figure 3:
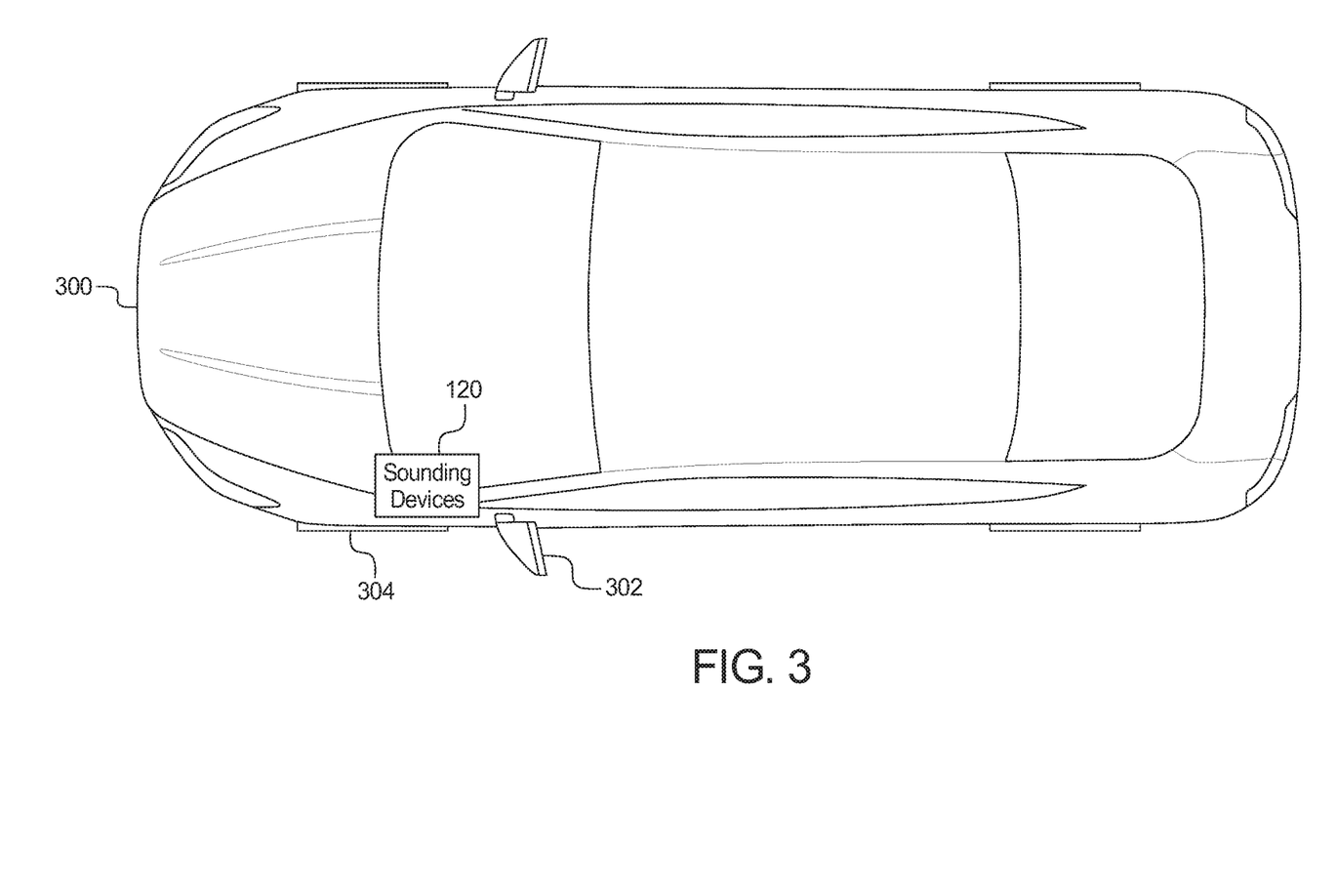
FIG. 3 illustrates the location of the multi-purpose sound device within the vehicle of FIG. 1.

FIG. 3 illustrates the location of the multi-purpose sound device 120 of FIG. 1. In this illustrated example, the multi-purpose sound device 120 is positioned in a vehicle 300 at a location that is between and adjacent to a side mirror 302 and a wheel well 304. In this location, the multi-purpose sound device is in close proximity with and is affixed/attached to a body/frame of the vehicle. Further, in this location, the multi-purpose sound device is in close proximity to a power source (e.g., the low-voltage battery), a power a distribution box, and/or the PTCU 130. Thus, the amount of hardware components (e.g., wiring) may be reduced in comparison with a conventional hybrid/electric light-duty vehicle. Further, in this location, the multi-purpose sound device is easily accessed through the hood of the car. Additionally, in this location, a sound generated by the multi-purpose sound device can be output in a wide range to reach multiple pedestrians in different positions with respect to the vehicle. In some examples, the multi-purpose sound device is the only device that generates external sound.

Figure 4:
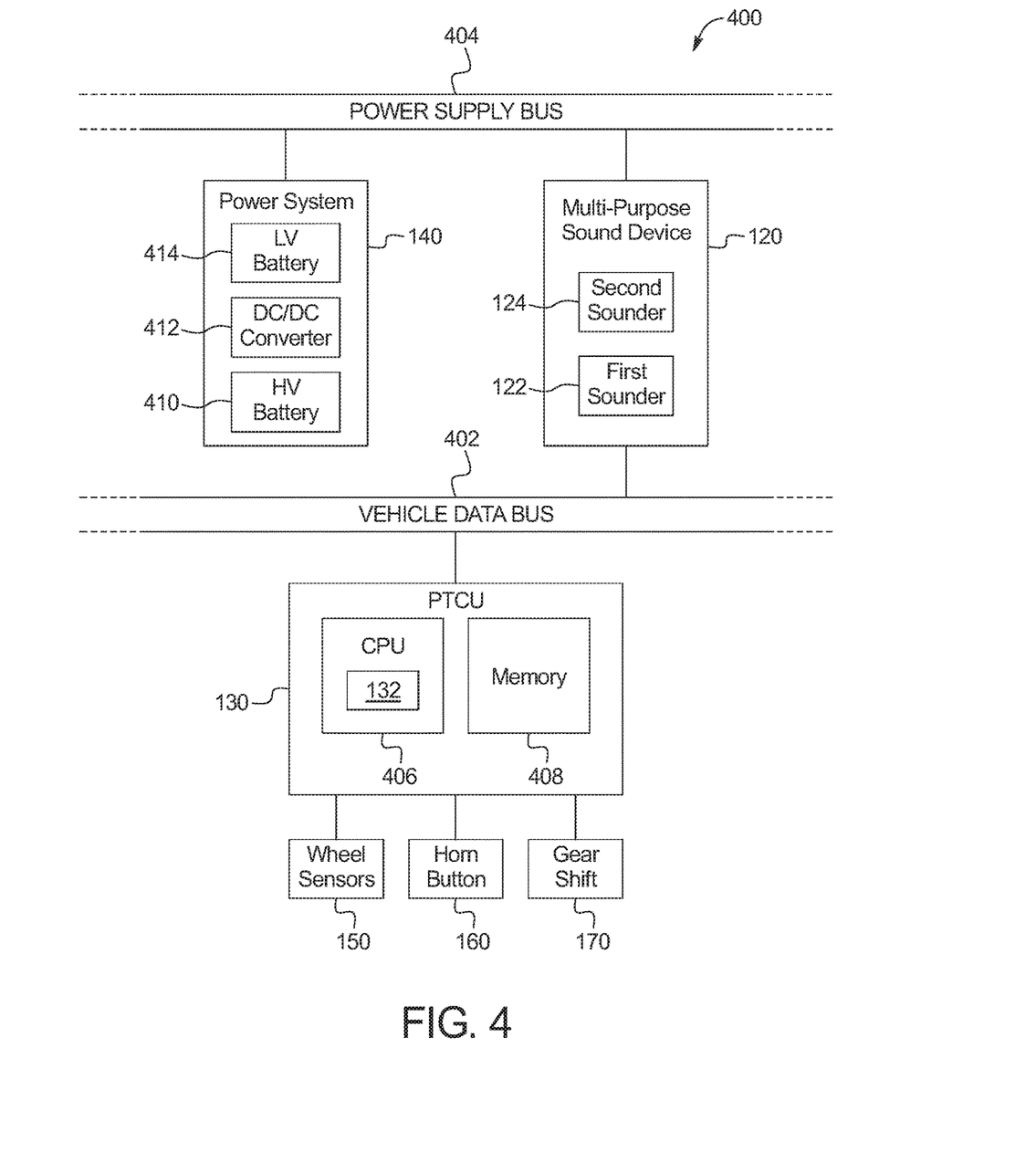
FIG. 4 is a block diagram of electronic components of the vehicle of FIG. 1.

FIG. 4 illustrates a block diagram of the electronic components 400 of the vehicle 100 of FIG. 1. In the illustrated example, the electronic components 400 include the power system 140, the multi-purpose sound device 120, the PTCU 130, a vehicle data bus 402, and a power supply bus 404.

The PTCU 130 communicates status of the vehicle 100 relating to the powertrain (e.g., the status of the ignition, the status of the transmission, the speed of the vehicle 100, etc.) onto a vehicle data bus (e.g., the vehicle data bus). The PTCU 130 includes a processor or controller 406 and memory 408. In the illustrated example, the PTCU 130 is structured to include AVAS controller 132. Alternatively, in some examples, the AVAS controller 132 may be incorporated into another electronic control unit (ECU) with its own processor and memory or may be incorporated into the processor and memory of the multi-purpose sound device 120. The processor or controller 406 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 408 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 408 includes multiple kinds of memory, particularly volatile memory and non-volatile memory.

The memory 408 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory, the computer readable medium, and/or within the processor during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 402 communicatively couples the PTCU 130 to the multi-purpose sound device 120. In some examples, the wheel speed sensors 150, horn button 160, and the gear shift 170 are also communicatively coupled to the PTCU 130 through the vehicle data bus 402. In some examples, the vehicle data bus 402 includes one or more data buses. The vehicle data bus 402 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The power system 140 is coupled to the multi-purpose sound device 120 through a power supply bus 404. In some examples, the power supply bus 404 includes one or more power buses. Although not illustrated in FIG. 4, in some examples, the power system is directly connected or connected through the power supply bus 404 to other components within the electronic components 400. In the illustrated example, the power system 140 includes a low-voltage (LV) battery 414 (e.g., 12 volts), a DC/DC converter 412, and a high-voltage battery 410.

Figure 5:
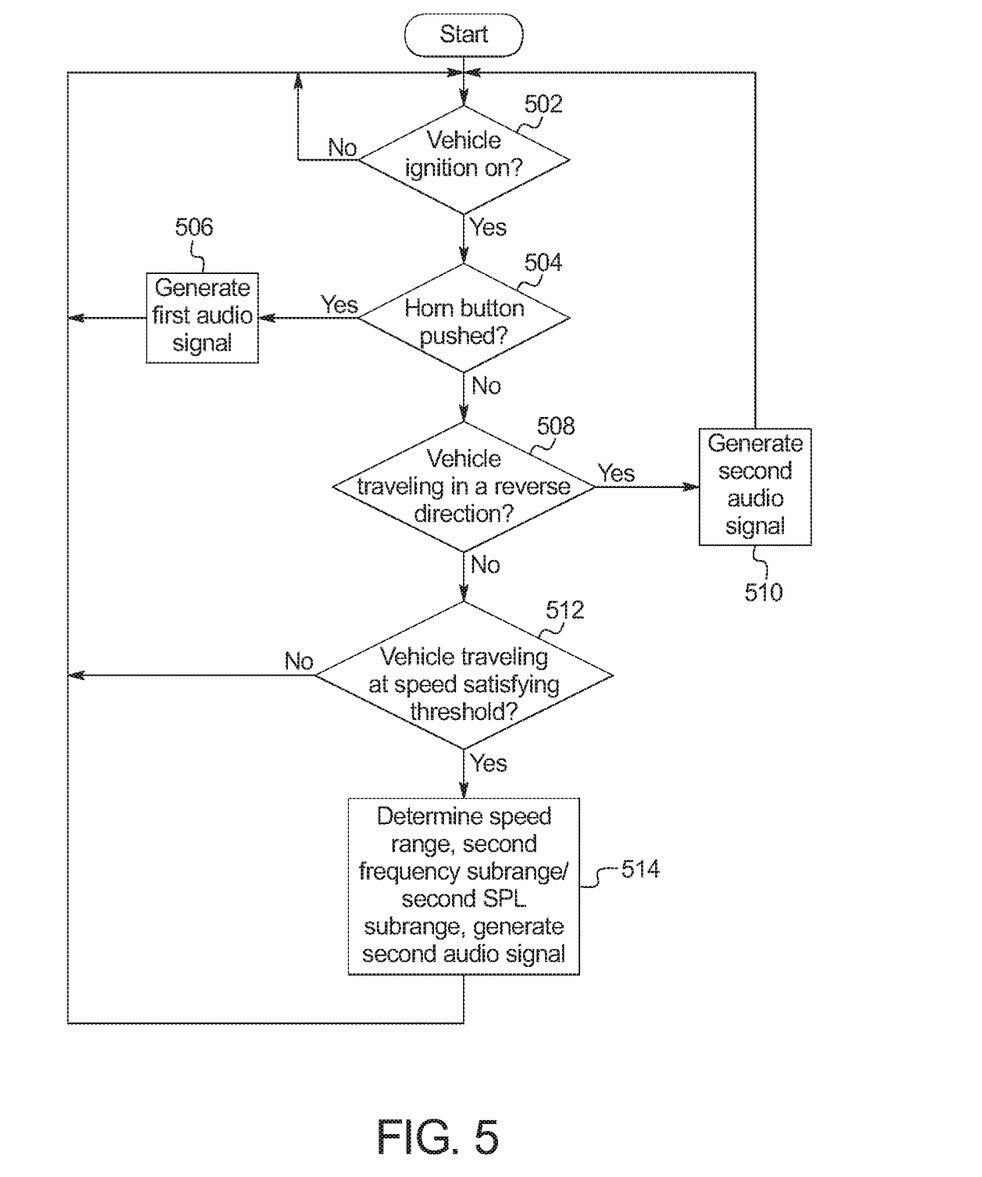
FIG. 5 is a flowchart of a method to generate audio signal based on the state of the vehicle, which may be implemented by the electronic components of FIG. 3.

FIG. 5 is a flowchart of a method to generate audio signal based on the state of the vehicle, which may be implemented by the electronic components 400 of FIG. 3. Initially, at block 502, the AVAS controller 132 waits until the ignition of the vehicle 100 is turned on. Once the AVAS controller 132 detects that the ignition of the vehicle 100 is turned on, the method continues to block 504. At block 504, the AVAS controller 132 determines whether the horn is triggered. For example the AVAS controller 132 may monitor the state of the horn button 160. When the AVAS controller 132 determines that the horn is triggered, the method continues at block 510. Otherwise, when the AVAS controller 132 determines that the horn is not triggered, the method continues at block 506.

At block 506, the AVAS controller controls the multi-purpose sound device 120 to operate in the first mode. In some examples, the AVAS controller 132 activates the first sounder 122 to generate the first audio signal, and deactivates the second sounder 124 (e.g., stand-by mode) to conserve power. The first sounder 122 generates the first audio signal at an SPL value within the first SPL range 210 and at a frequency value within the first frequency range 215. For example, the SPL of the first audio signal may be within the 90-96 dB range, and the frequency value of the first audio signal may be within one of the 360-430 Hz or the 450-520 Hz ranges. Subsequently, the method returns to the block 502.

At block 508, the AVAS controller 132 determines whether the vehicle 100 is traveling in a reverse direction. For example, the AVAS controller 132 may monitor the direction of travel of the vehicle 100 from the gear shift 170. In another example, the AVAS controller 132 may monitor the direction of travel of the vehicle using travel data from a GPS receiver. When the AVAS controller 132 detects that the vehicle 100 is traveling in a reverse direction, the method continues to block 510. Otherwise, the method continues to block 512.

At block 510, the AVAS controller controls the multi-purpose sound device 120 to operate in the second mode. In some examples, the AVAS controller 132 activates the second sounder 124 to generate the second audio signal, and deactivates the second sounder 124 (e.g., stand-by mode) to conserve power. The second sounder 124 generates the first audio signal at an SPL value within the second SPL range 230 and at a frequency value within the second frequency range 235. For example, the SPL value of the second audio signal may be within the 52-63 dB range, and the frequency value of the second audio signal may be within one of the 270-370 Hz, the 450-550 Hz, the 750-850 Hz, or the 1200-1300 Hz ranges. Subsequently, the method returns to the block 502.

At block 512, the AVAS controller detects whether the vehicle 100 is traveling forward under a threshold speed (e.g., under 30 km/h). If the vehicle 100 is traveling forward under the threshold speed, the method continues to block 514. Otherwise, the method returns to the block 502.

At block 514, the AVAS controller detects whether the vehicle 100 is traveling forward at a speed that satisfies one of the speed ranges. In some examples, the speed ranges are lower than the threshold speed. For example, the AVAS controller 132 may define speed ranges from 0-10 km/h, 10 km/h to 20 km/h, 20 to 30 km/h, and/or 30 km/h or greater. In such examples, the second frequency range 235 and/or SPL range 230 is partitioned into subranges, and each of the second frequency subranges and/or SPL subranges may be assigned to each of the speed ranges. When the vehicle 100 travels forward at a speed that satisfies one of the speed ranges, the second sounder 124 generates the second audio signal at a frequency or a SPL within the second frequency subrange or SPL subrange corresponding to that speed range. After the second audio signal is generated, the method returns to the block 502.

The flowchart of FIG. 5 is representative of machine readable instructions stored in memory (such as the memory 408 of FIG. 4) that comprise one or more programs that, when executed by a processor (such as the processor 406 of FIG. 4), cause the vehicle 100 to implement the example AVAS controller 132 of FIGS. 1 and 4. Further, although the example program(s) is/are described with reference to the flowchart illustrated in FIG. 5, many other methods of implementing the example AVAS controller 132 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    front and rear wheels;
    side mirrors;
    a sound device configured to operate in a first mode and a second mode to generate an audio signal, the sound device separate from and disposed adjacent to one of the front wheels and one of the side mirrors; and
    a controller configured to activate the sound device in the first mode or the second mode based on a state of the vehicle, wherein the sound device comprises a first sounder and a second sounder, wherein:
    when the controller activates the sound device in the first mode, the first sounder generates a first audio signal at a sound pressure level (SPL) within a first SPL range and at a frequency within a first frequency range; and
    when the controller activates the sound device in the second mode, the second sounder generates a second audio signal at a SPL within a second SPL range and a frequency within a second frequency range, and
    wherein the controller is further configured to:
    define the first SPL range, the first frequency range, the second SPL range, and the second frequency range; and
    wherein the controller is configured to detect at least a portion of second frequency range that overlaps with the first frequency range and omit the overlapping portion of the second frequency range.

2. The vehicle of claim 1, wherein the sound device is the only external sound generating device of the vehicle.

3. The vehicle of claim 1, wherein the controller is configured to activate the sound device in the first mode in response to an external input, and
    wherein the controller is configured to activate the sound device in the second mode in response to the vehicle traveling in reverse or the vehicle traveling forward at a speed satisfying a speed threshold.

4. The vehicle of claim 3, wherein the first audio signal is a fixed audio signal and the second audio signal is a variable audio signal.

5. The vehicle of claim 4, wherein the controller is configured to:
    partition the second frequency range or the second SPL range to generate second frequency subranges or second SPL subranges;
    assign each of the second frequency subranges or the second SPL subranges to each of a plurality of speed ranges, the plurality of speed ranges being lower than the speed threshold; and
    generate the second audio signal at a frequency or SPL within a second frequency subrange or second SPL subrange assigned to one of the plurality of speed ranges.

6. The vehicle of claim 1, wherein the sound device further comprises a switch, and wherein the switch is configured to control an amount of power supplied to the first sounder or the second sounder.

7. The vehicle of claim 1, wherein the controller deactivates the second sounder in response to activating the sound device in the first mode,
    wherein the controller deactivates the first sounder in response to activating the sound device in the second mode.

8. A method of operating a vehicle, comprising:
    detecting, by a controller, a state of the vehicle;
    determining, by the controller, whether an input corresponds to a first mode or a second mode based on the state of the vehicle;
    generating, by a sound device, an audio signal corresponding to the input, the audio signal generated from a location separate from and adjacent to a front wheel and a side mirror of the vehicle;
    responsive to determining that the input correspond to the first mode, generating, by a first sounder included in the sound device, a first audio signal at a sound pressure level (SPL) falling under a first SPL range and at a frequency falling under a first frequency range;

responsive to determining that the input correspond to the second mode, generating, by a second sounder included in the sound device, a second audio signal at a SPL falling under a second SPL range and a frequency falling under a second frequency range;

defining, by the controller, the first SPL range, the first frequency range, the second SPL range, and the second frequency range;

detecting, by the controller, at least a portion of the second frequency range that overlaps with the first frequency range; and omitting, by the controller, the overlapping portion of the second frequency range.

9. The method of claim 8, wherein the sound device is the only external sound generating device the vehicle.

10. The method of claim 8, wherein the determining includes:
activating the sound device in the first mode in response to an external input; and
activating the sound device in the second mode in response to the vehicle traveling in reverse or the vehicle traveling forward at a speed satisfying a speed threshold.

11. The method of claim 10, wherein the first audio signal is a fixed audio signal and the second audio signal is a variable audio signal.

12. The method of claim 11, comprising:
partitioning, by the controller, the second frequency range or the second SPL range to generate second frequency subranges or second SPL subranges;
assigning, by the controller, each of the second frequency subranges or the second SPL subranges to each of a plurality of speed ranges, the plurality of speed ranges being lower than the speed threshold; and
generating, by the sound device, the second audio signal at a frequency or SPL within second frequency subrange or second SPL subrange assigned to one of the plurality of speed ranges.

13. The method of claim 10, comprising:
controlling, by a switch included in the sound device, an amount of power supplied to the first sounder or the second sounder.

14. The method of claim 10, comprising:
responsive to determining that the input correspond to the first mode, causing, by the controller, the second sounder to be deactivated; and
responsive to determining that the input correspond to the second mode, causing, by the controller, the first sounder to be deactivated.

* * * * *